US010323692B2

(12) United States Patent
Lentini et al.

(10) Patent No.: US 10,323,692 B2
(45) Date of Patent: Jun. 18, 2019

(54) SLIP YOKE ASSEMBLY

(71) Applicant: ArvinMeritor Technology, LLC, Troy, MI (US)

(72) Inventors: Anthony Lentini, Armada, MI (US); Christopher Steele, Lake Orion, MI (US); Dale Kwasniewski, Galesburg, MI (US); Kenneth Lang, Goodrich, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 209 days.

(21) Appl. No.: 15/406,831

(22) Filed: Jan. 16, 2017

(65) Prior Publication Data

US 2018/0202497 A1 Jul. 19, 2018

(51) Int. Cl.

| | |
|---|---|
| *F16C 3/06* | (2006.01) |
| *F16D 3/06* | (2006.01) |
| *F16D 1/10* | (2006.01) |
| *F16D 3/18* | (2006.01) |
| *F16D 3/38* | (2006.01) |
| *F16D 3/84* | (2006.01) |
| *F16C 3/03* | (2006.01) |
| *F16D 1/06* | (2006.01) |

(52) U.S. Cl.
CPC ............. *F16D 3/06* (2013.01); *F16D 1/10* (2013.01); *F16D 3/185* (2013.01); *F16D 3/387* (2013.01); *F16D 3/848* (2013.01); *F16C 3/03* (2013.01); *F16D 2001/062* (2013.01)

(58) Field of Classification Search
CPC ... F16C 3/03; F16D 3/06; F16D 3/848; F16D 3/387; F16D 1/10; F16D 3/185; F16D 2001/062

USPC .................................................. 464/134, 162
See application file for complete search history.

(56) References Cited

U.S. PATENT DOCUMENTS

| | | | |
|---|---|---|---|
| 4,945,745 A | * | 8/1990 | Bathory ............... B21B 35/143 464/162 |
| 5,634,853 A | | 6/1997 | Smith |
| 5,674,024 A | | 10/1997 | Castellon |
| 5,813,794 A | | 9/1998 | Castellon |
| 5,903,965 A | | 5/1999 | Fletcher et al. |
| 6,093,107 A | * | 7/2000 | Merlo ....................... F16C 3/03 464/134 |
| 6,234,907 B1 | | 5/2001 | Moser |
| 6,241,616 B1 | | 6/2001 | Lightcap |
| 6,491,126 B1 | | 12/2002 | Robison et al. |

(Continued)

FOREIGN PATENT DOCUMENTS

| | | |
|---|---|---|
| CN | 200977942 Y | 11/2007 |
| CN | 101512172 A | 8/2009 |

(Continued)

OTHER PUBLICATIONS

European Patent Office, Extended European Search Report for corresponding Application No. EP17204868.8-1012, dated Jun. 25, 2018.

*Primary Examiner* — Greg Binda
(74) *Attorney, Agent, or Firm* — Brooks Kushman P.C.

(57) ABSTRACT

A slip yoke assembly having a shaft sleeve, a yoke sleeve, and a yoke. The yoke sleeve may have a set of yoke sleeve splines that may mate with a set of shaft sleeve splines and permit axial movement of the yoke sleeve with respect to the shaft sleeve. The yoke may be fixedly disposed on the yoke sleeve.

20 Claims, 5 Drawing Sheets

(56) References Cited

U.S. PATENT DOCUMENTS

| 6,863,634 B2 | 3/2005 | Holman et al. |
| 2015/0075897 A1 | 3/2015 | Copeland |

FOREIGN PATENT DOCUMENTS

| CN | 102094891 A | 6/2011 |
| CN | 204784257 U | 11/2015 |
| DE | 19709282 A1 | 9/1998 |
| GB | 1126071 A | 9/1968 |

* cited by examiner

SLIP YOKE ASSEMBLY

TECHNICAL FIELD

This disclosure relates to a slip yoke assembly, such as may be provided with a drivetrain of a vehicle.

BACKGROUND

A slip yoke assembly for a vehicle driveshaft is disclosed in U.S. Pat. No. 5,634,853.

SUMMARY

In at least one embodiment, a slip yoke assembly is provided. The slip yoke assembly may include a shaft sleeve, a yoke sleeve, and a yoke. The shaft sleeve may be rotatable about an axis. The shaft sleeve may have a set of shaft sleeve splines that face away from the axis. The yoke sleeve may receive the shaft sleeve. The yoke sleeve may have a set of yoke sleeve splines that may mate with the set of shaft sleeve splines and permit axial movement of the yoke sleeve with respect to the shaft sleeve. The yoke may be fixedly disposed on the yoke sleeve. The yoke and the yoke sleeve may be movable along the axis with respect to the shaft sleeve.

In at least one embodiment, a slip yoke assembly is provided. The slip yoke assembly may include a shaft sleeve, a yoke sleeve, a yoke, and an outer sleeve. The shaft sleeve may have an inner surface, a first shaft sleeve cavity, and a set of shaft sleeve splines. The first shaft sleeve cavity may extend around the axis. The inner surface may at least partially define the first shaft sleeve cavity. The set of shaft sleeve splines may be disposed opposite the inner surface. The yoke sleeve may extend around and may receive the shaft sleeve. The yoke sleeve may have a set of yoke sleeve splines that may mate with the set of shaft sleeve splines and permit axial movement of the yoke sleeve with respect to the shaft sleeve. The yoke may be fixedly positioned with respect to the yoke sleeve. The outer sleeve may be disposed on the shaft sleeve and may extend around and may receive the yoke sleeve.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
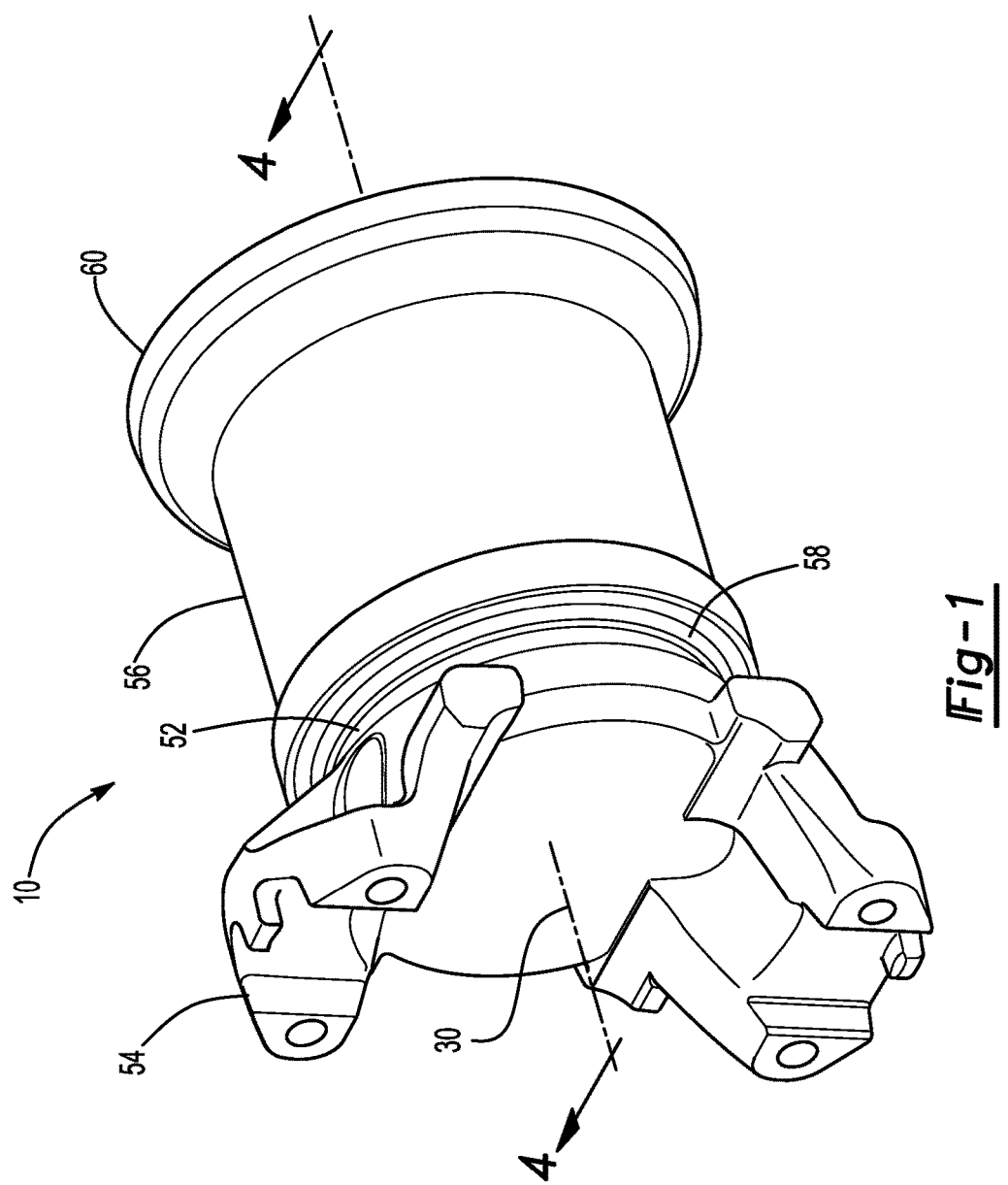
FIG. 1 is a perspective view of an example of a slip yoke assembly.

Referring to FIG. 1, an example of a slip yoke assembly 10 is shown. The slip yoke assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 4:
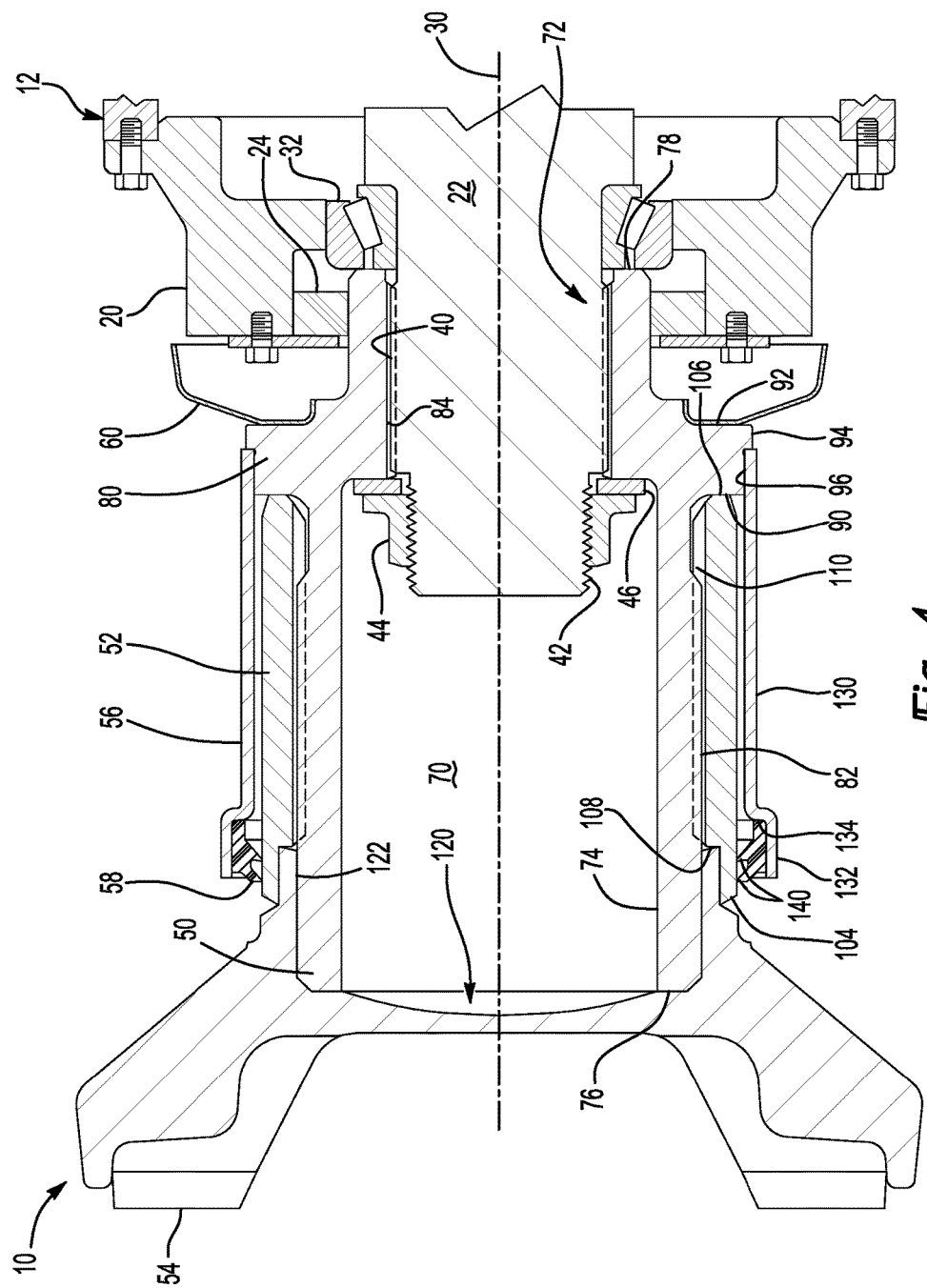
FIG. 4 is a section view of the slip yoke assembly along section line 4-4 with the yoke and yoke sleeve of the slip yoke assembly in a first position.

Referring to FIG. 4, the slip yoke assembly 10 may be provided with a drivetrain component 12 such as an axle assembly, a transfer case, or the like. For example, an axle assembly may be part of a vehicle drivetrain that may provide torque to one or more traction wheel assemblies that may include a tire mounted on a wheel. One or more axle assemblies may be provided with the vehicle. For instance, the axle assembly may be a single drive axle assembly or may be configured as part of a tandem axle configuration or multi-axle configuration that may include a plurality of axle assemblies that may be connected in series. The drivetrain component 12 may include a housing 20, a shaft 22, and a housing seal 24.

The housing 20 may receive various parts of the drivetrain component 12. In addition, the housing 20 may facilitate mounting of the drivetrain component 12 to the vehicle.

The shaft 22 may be at least partially received in the housing 20 and may be configured to rotate about an axis 30. For example, the shaft 22 may be rotatably supported by one or more roller bearing assemblies 32 that may be disposed on a housing 20. The shaft 22 may have any suitable configuration. For example, the shaft 22 may include a splined portion 40 and a threaded portion 42.

The splined portion 40 may engage the slip yoke assembly 10. The splined portion 40 may include a set of shaft splines that may be arranged in a repeating pattern around the axis 30. The shaft splines may extend substantially parallel to the axis 30 to facilitate installation of the slip yoke assembly 10 as will be discussed in more detail below. The splined portion 40 may have a larger diameter than the threaded portion 42.

The threaded portion 42 may be disposed between the splined portion 40 and an end of the shaft 22. The threaded portion 42 may include one or more threads that may be disposed around the axis 30. The thread of the threaded portion 42 may mate with a corresponding thread on a nut 44. The nut 44 may couple the slip yoke assembly 10 to the shaft 22 and may exert a load force that may inhibit axial movement of the slip yoke assembly 10 with respect to the shaft 22. A washer 46 may be disposed between the slip yoke assembly 10 and the nut 44 in one or more embodiments.

The shaft 22 may be of any suitable type. In the context of an axle assembly, the shaft 22 may be an input shaft or an output shaft. An input shaft may receive torque from a torque source, such as an engine or another axle assembly. For instance, the input shaft may be operatively connected to a drive shaft or a prop shaft that may provide torque to the axle assembly. An output shaft may provide torque to another drivetrain component or axle assembly. For instance, an output shaft may be operatively connected to a prop shaft that may provide torque to another axle assembly that may be connected in series with the axle assembly.

The housing seal 24 may be disposed between the housing 20 and the shaft 22. In at least one configuration, the housing seal 24 may be configured as a ring that may extend continuously around the slip yoke assembly 10 and that may extend from the slip yoke assembly 10 to the housing 20.

The housing seal 24 may inhibit contaminants from entering the housing 20 and may help contain lubricant inside the housing 20.

Figure 2:
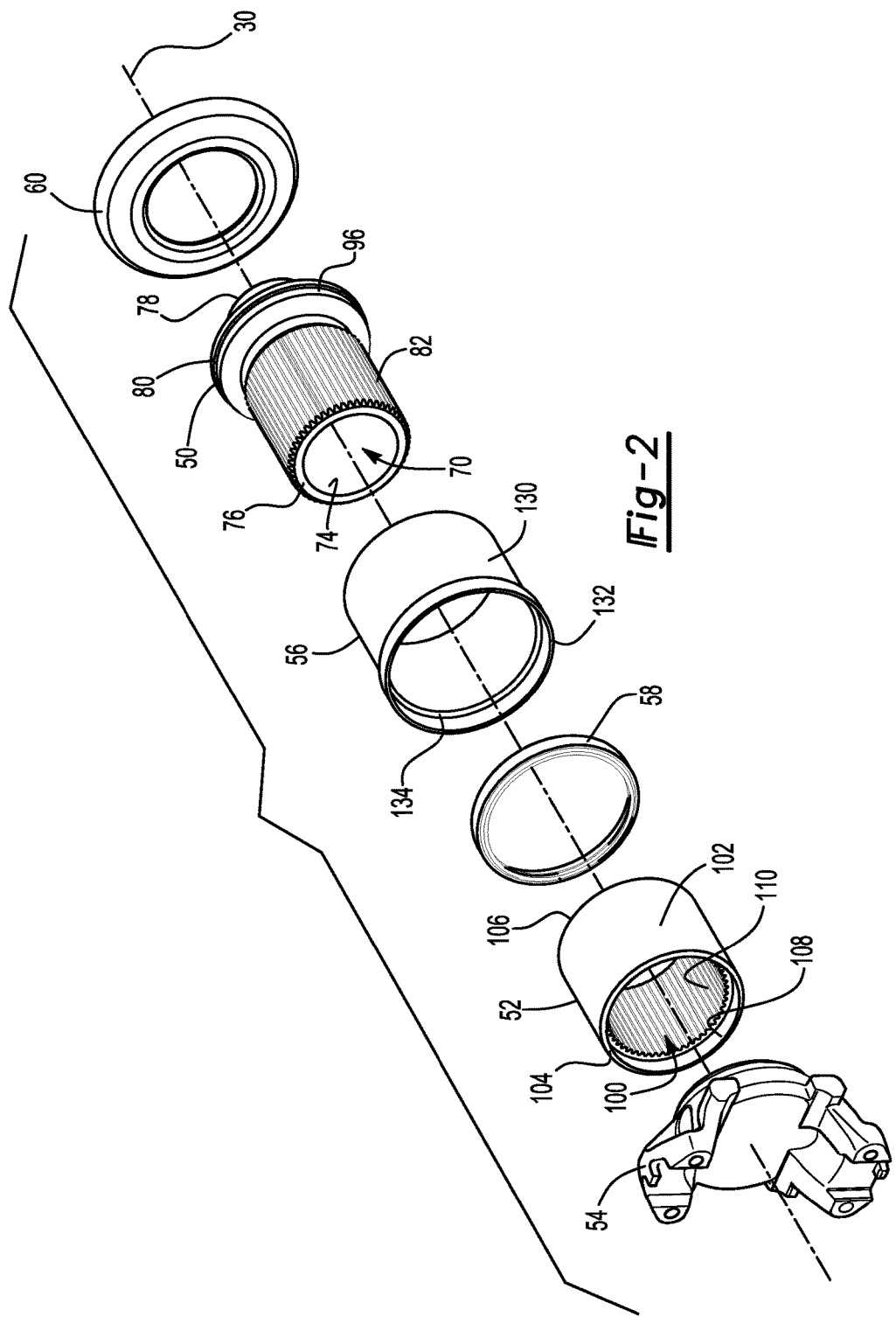
FIGS. 2 and 3 are exploded views of the slip yoke assembly of FIG. 1.
Figure 3:
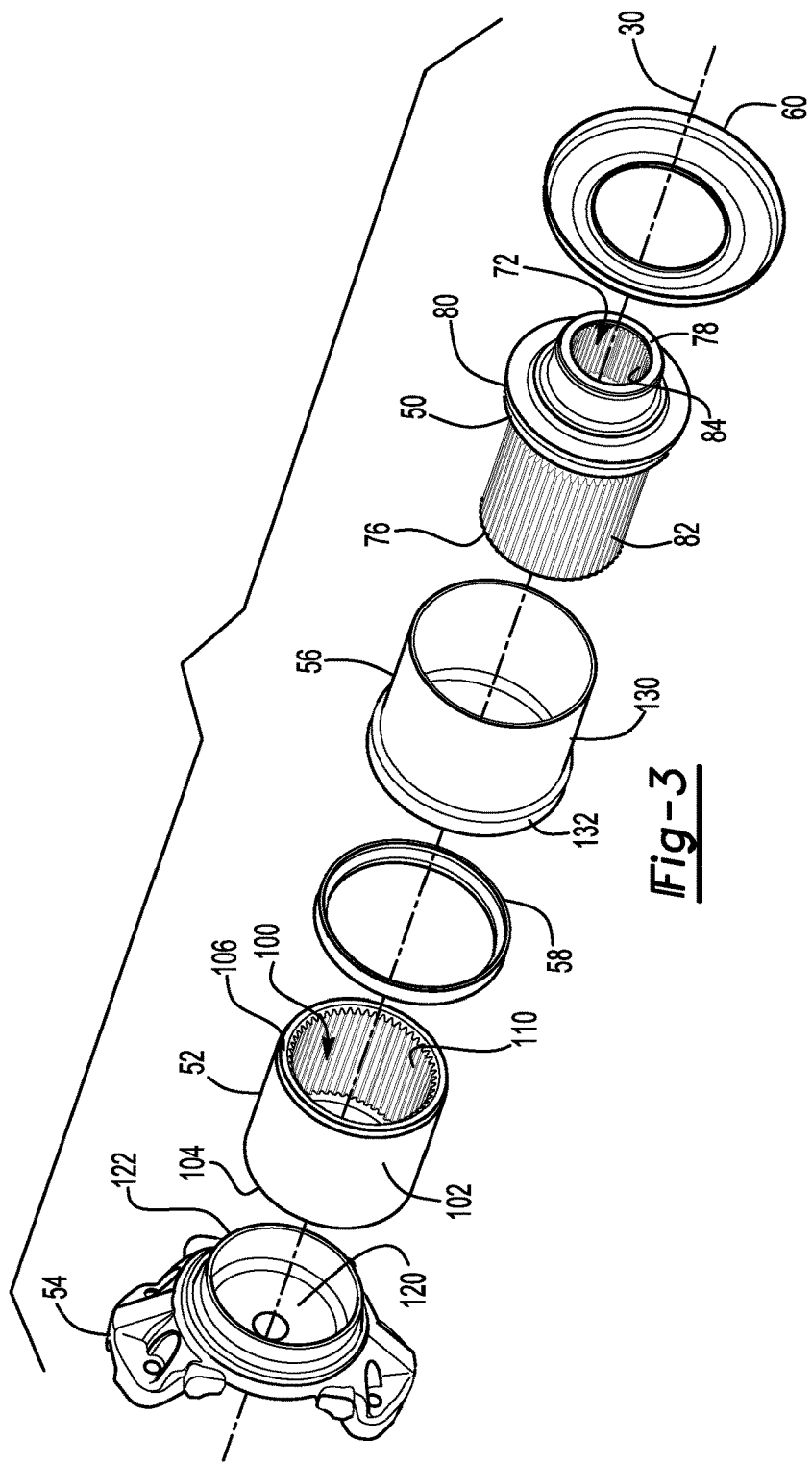

Referring to FIGS. 1-3, the slip yoke assembly 10 may operatively connect the shaft 22 to a drive shaft or a prop shaft. In at least one configuration, the slip yoke assembly 10 may include a shaft sleeve 50, a yoke sleeve 52, a yoke 54, an outer sleeve 56, a seal 58, and a deflector 60.

Referring to FIGS. 2-4, the shaft sleeve 50 may be disposed on the shaft 22. For instance, the shaft sleeve 50 may be disposed on the shaft 22 such that the shaft 22 is received in the shaft sleeve 50. As such, the slip yoke assembly 10 and its associated components may be disposed outside of the shaft 22 and may not be received in a bore or cavity of the shaft 22, In at least one configuration, the shaft sleeve 50 may include a first shaft sleeve cavity 70, a second shaft sleeve cavity 72, an inner surface 74, a first shaft sleeve end surface 76, a second shaft sleeve end surface 78, a shaft sleeve flange 80, a first set of shaft sleeve splines 82, and a second set of shaft sleeve splines 84.

The first shaft sleeve cavity 70 may extend around the axis 30 and may be radially disposed with respect to the axis 30. The first shaft sleeve cavity 70 may extend along the axis 30 or in an axial direction from the first shaft sleeve end surface 76 to the second shaft sleeve cavity 72. As is best shown in FIG. 4, the first shaft sleeve cavity 70 may receive a portion of the shaft 22, such as the threaded portion 42. In addition, the first shaft sleeve cavity 70 may receive the nut 44 and the washer 46. The first shaft sleeve cavity 70 may have a larger diameter than the second shaft sleeve cavity 72.

The second shaft sleeve cavity 72 may extend around the axis 30 and may be radially disposed with respect to the axis 30. Moreover, the second shaft sleeve cavity 72 may be coaxially disposed with the first shaft sleeve cavity 70. The second shaft sleeve cavity 72 may extend in an axial direction from the second shaft sleeve end surface 78 to the first shaft sleeve cavity 70. The second shaft sleeve cavity 72 may receive a portion of the shaft 22, such as the splined portion 40.

The inner surface 74 may at least partially define a first shaft sleeve cavity 70. The inner surface 74 may face toward and may be radially disposed with respect to the axis 30. The inner surface 74 may extend from the first shaft sleeve end surface 76 toward the second shaft sleeve end surface 78. In addition, the inner surface 74 may be disposed opposite the first set of shaft sleeve splines 82.

The first shaft sleeve end surface 76 may be disposed at an end of the shaft sleeve 50. The first shaft sleeve end surface 76 may face toward the yoke 54. In addition, the first shaft sleeve end surface 76 may extend from the inner surface 74 to or toward the first set of shaft sleeve splines 82.

The second shaft sleeve end surface 78 may be disposed opposite the first shaft sleeve end surface 76. The second shaft sleeve end surface 78 may be received in the housing 20 and may engage a portion of the drivetrain component 12 to inhibit axial movement of the shaft sleeve 50. For instance, the second shaft sleeve end surface 78 may engage a roller bearing assembly 32 in one or more embodiments.

The shaft sleeve flange 80 may facilitate mounting of the outer sleeve 56 and the deflector 60. The shaft sleeve flange 80 may extend away from the axis 30 and may extend further from the axis 30 than the first set of shaft sleeve splines 82. In at least one configuration, the shaft sleeve flange 80 may be configured as a ring that may extend continuously around the axis 30. The shaft sleeve flange 80 may be axially positioned between the first shaft sleeve end surface 76 and the second shaft sleeve end surface 78. For example, the shaft sleeve flange 80 may be axially positioned between the first set of shaft sleeve splines 82 and the deflector 60. The shaft sleeve flange 80 may extend around the first shaft sleeve cavity 70, the second shaft sleeve cavity 72, or both. In at least one embodiment, the shaft sleeve flange 80 may include a first flange side surface 90, a second flange side surface 92, an outer flange surface 94, and a flange groove 96.

The first flange side surface 90 may face toward the yoke sleeve 52. The first flange side surface 90 may be disposed substantially perpendicular to the axis 30 and one or more embodiments.

The second flange side surface 92 may be disposed opposite the first flange side surface 90. The second flange side surface 92 may face toward and may engage the deflector 60.

The outer flange surface 94 may extend from the second flange side surface 92 toward the first flange side surface 90. The outer flange surface 94 may face away from and may extend continuously around the axis 30.

The flange groove 96 may extend from the first flange side surface 90 toward the second flange side surface 92. The flange groove 96 may extend continuously around the axis 30 and may be disposed closer to the axis 30 than the outer flange surface 94. The flange groove 96 may receive and facilitate mounting of the outer sleeve 56.

The first set of shaft sleeve splines 82 may facilitate mounting of the yoke sleeve 52 to the shaft sleeve 50. As is best shown in FIG. 2, the first set of shaft sleeve splines 82 may be arranged in a repeating pattern around the axis 30 and the first shaft sleeve cavity 70. As such, the first set of shaft sleeve splines 82 may face away from the axis 30 and may be disposed opposite the first shaft sleeve cavity 70 and the inner surface 74. The first set of shaft sleeve splines 82 may extend in an axial direction between the first shaft sleeve end surface 76 and the shaft sleeve flange 80. The first set of shaft sleeve splines 82 may extend substantially parallel to the axis 30 to facilitate axial movement of the yoke sleeve 52 and the yoke 54 with respect to the shaft sleeve 50.

The second set of shaft sleeve splines 84 may facilitate mounting of the shaft sleeve 50 to the shaft 22. The second set of shaft sleeve splines 84 may be disposed in the second shaft sleeve cavity 72 and may extend toward the axis 30. As is best shown in FIG. 3, the second set of shaft sleeve splines 84 may be arranged in a repeating pattern around the axis 30 and may extend substantially parallel to the axis 30. The second set of shaft sleeve splines 84 may extend in an axial direction between the first shaft sleeve cavity 70 and the second shaft sleeve end surface 78. As such, the second set of shaft sleeve splines 84 may be axially disposed between the roller bearing assembly 32 and the washer 46. The second set of shaft sleeve splines 84 may mate with the splines on the splined portion 40 of the shaft 22 and may cooperate to inhibit rotation of the shaft sleeve 50 about the axis 30 with respect to the shaft 22.

Referring to FIGS. 2-4, the yoke sleeve 52 may extend around and may receive the shaft sleeve 50. In addition, the yoke sleeve 52 may be movable in an axial direction with respect to the shaft sleeve 50. In at least one configuration, the yoke sleeve 52 may include a yoke sleeve hole 100, an outer yoke sleeve surface 102, a first yoke sleeve end surface 104, a second yoke sleeve end surface 106, a yoke sleeve groove 108, and a set of yoke sleeve splines 110.

The yoke sleeve hole 100 may extend around the axis 30 and may extend through the yoke sleeve 52. At least a portion of the shaft sleeve 50 and the first set of shaft sleeve splines 82 may be received in the yoke sleeve hole 100.

The outer yoke sleeve surface 102 may be disposed opposite the yoke sleeve hole 100. The outer yoke sleeve surface 102 may face away from the axis 30 and may extend from the first yoke sleeve end surface 104 to the second yoke sleeve end surface 106.

The first yoke sleeve end surface 104 may be disposed at an end of the yoke sleeve 52. The first yoke sleeve end surface 104 may face toward and may be disposed adjacent to the yoke 54. In addition, the first yoke sleeve end surface 104 may extend from the outer yoke sleeve surface 102 to the yoke sleeve groove 108.

The second yoke sleeve end surface 106 may be disposed opposite the first yoke sleeve end surface 104. The second yoke sleeve end surface 106 may face toward the shaft sleeve flange 80. In addition, the second yoke sleeve end surface 106 may extend from the outer yoke sleeve surface 102 toward the axis 30.

The yoke sleeve groove 108 may facilitate mounting of the yoke 54 to the yoke sleeve 52. The yoke sleeve groove 108 may extend from the first yoke sleeve end surface 104 toward the second yoke sleeve end surface 106. In the configuration shown, the yoke sleeve groove 108 is disposed inside the yoke sleeve 52 and extends from the first yoke sleeve end surface 104 to the set of yoke sleeve splines 110. It is also contemplated that the yoke sleeve groove 108 may be disposed on the outside of the yoke sleeve 52 and may extend from the outer yoke sleeve surface 102 toward the axis 30. Alternatively, it is also contemplated that the yoke sleeve groove 108 may be omitted in one or more embodiments.

The set of yoke sleeve splines 110 may facilitate mounting of the yoke sleeve 52 to the shaft sleeve 50. The yoke sleeve splines 110 may be disposed in the yoke sleeve hole 100 and may extend toward the axis 30. As is best shown in FIGS. 2 and 3, the yoke sleeve splines 110 may be arranged in a repeating pattern around the axis 30 and may extend substantially parallel to the axis 30. The yoke sleeve splines 110 may extend in an axial direction between the first yoke sleeve end surface 104 and the second yoke sleeve end surface 106. For instance, the yoke sleeve splines 110 may extend from the yoke sleeve groove 108 to the second yoke sleeve end surface 106. The yoke sleeve splines 110 may mate with the first set of shaft sleeve splines 82 and may cooperate to permit axial movement of the yoke sleeve 52 while inhibiting rotation of the yoke sleeve 52 about the axis 30 with respect to the shaft sleeve 50.

Referring to FIGS. 2-4, the yoke 54 may be fixedly disposed on the yoke sleeve 52. As such, the yoke 54 may not rotate with respect to the yoke sleeve 52. Moreover, the yoke 54 and the yoke sleeve 52 may move together in an axial direction with respect to the shaft sleeve 50. The yoke 54 may facilitate coupling of the slip yoke assembly 10 to another component to facilitate the transmission of torque. For example, the yoke 54 may be coupled to a universal joint, which in turn may be operatively connected to a rotating drivetrain component, such as a drive shaft or a prop shaft. In at least one configuration, the yoke 54 may include a yoke cavity 120 and a yoke mounting portion 122.

Referring to FIGS. 3 and 4, the yoke cavity 120 may be configured to receive the shaft sleeve 50. The yoke cavity 120 may extend around and may be radially disposed with respect to the axis 30. In the configuration shown, the yoke cavity 120 is configured as a blind hole that has an opening that faces toward the shaft sleeve 50.

The yoke mounting portion 122 may facilitate mounting of the yoke 54 to the yoke sleeve 52. The yoke mounting portion 122 may have any suitable configuration that is compatible with the configuration of the yoke sleeve 52. In the configuration shown in FIGS. 3 and 4, the yoke mounting portion 122 is received in the yoke sleeve groove 108 and may at least partially define the yoke cavity 120. It is also contemplated that the yoke mounting portion 122 may be disposed on the outside of the yoke 54 and may receive the yoke sleeve 52. Alternatively, the yoke mounting portion 122 may abut the first yoke sleeve end surface 104 such that the yoke 54 does not receive the yoke sleeve 52 and the yoke sleeve 52 does not receive the yoke 54.

The yoke 54 may be fixedly coupled to the yoke sleeve 52 in any suitable manner. For instance, the yoke sleeve groove 108 and the yoke mounting portion 122 may engage with an interference fit to secure the yoke 54 to the yoke sleeve 52. It is also contemplated that an adhesive, mechanical fastener, weld, or combinations thereof may be provided to fixedly couple the yoke 54 to the yoke sleeve 52. It is also contemplated that the yoke 54 may be integrally formed with the yoke sleeve 52 and thus the yoke 54 and yoke sleeve 52 may be a unitary one-piece component.

Referring to FIGS. 2-4, the outer sleeve 56 may be disposed on and may be mounted to the shaft sleeve 50. In addition, the outer sleeve 56 may extend around and may receive the yoke sleeve 52. As such, the outer sleeve 56 may be disposed proximate and may engage the shaft sleeve 50 and may be spaced apart from and may not engage the yoke sleeve 52 or the yoke 54. Moreover, the outer sleeve 56 may have a fixed axial length and may not move axially or change in length when the yoke 54 and yoke sleeve 52 move in an axial direction. In at least one configuration, the outer sleeve 56 may include a first cylindrical portion 130 and a second cylindrical portion 132.

The first cylindrical portion 130 may facilitate mounting of the outer sleeve 56 to the shaft sleeve 50. For instance, the first cylindrical portion 130 may receive and may be fixedly disposed on the shaft sleeve flange 80. As is best shown in FIG. 4, the first cylindrical portion 130 may be received in the flange groove 96 of the shaft sleeve flange 80. The first cylindrical portion 130 may be secured to the shaft sleeve 50 in any suitable manner, such as with an adhesive, interference fit, mechanical fastener, weld, or combinations thereof.

The second cylindrical portion 132 may be disposed adjacent to the first cylindrical portion 130. The second cylindrical portion 132 may be disposed at an end of the outer sleeve 56 that may be disposed opposite the shaft sleeve flange 80. The second cylindrical portion 132 may facilitate mounting of the seal 58 to the outer sleeve 56. For instance, the second cylindrical portion 132 may be configured to extend around and receive the seal 58. The second cylindrical portion 132 may have a different diameter than the first cylindrical portion 130. For instance, the second cylindrical portion 132 may have a larger diameter than the first cylindrical portion 130 in one or more embodiments. In such a configuration, a step surface 134 may extend between the first cylindrical portion 130 to the second cylindrical portion 132.

Referring to FIGS. 2-4, the seal 58 may help inhibit contaminants from entering the slip yoke assembly 10. The seal 58 may extend around the yoke sleeve 52. For example, the seal 58 may be configured as a ring that may extend continuously around the yoke sleeve 52. The seal 58 may be disposed between the outer sleeve 56 and the shaft sleeve 50 and may extend from the outer sleeve 56 to the yoke sleeve 52. The seal 58 may be axially positioned at or near and an end of the outer sleeve 56. For instance, the seal 58 may be received in the second cylindrical portion 132 of the outer sleeve 56 and may extend axially from the second end of the outer sleeve 56 to the step surface 134. As such, the step surface 134 may inhibit axial movement of the seal 58 toward the shaft sleeve flange 80.

The seal 58 may be made of any suitable material, such as rubber or a polymeric material. As is best shown in FIG. 4, the seal 58 may include one or more lips 140 that may extend toward and may engage the yoke sleeve 52. The lips 140 may provide multiple points of contact or contact surfaces between the seal 58 and the yoke sleeve 52. In addition, the lips 140 may be configured to flex to facilitate axial movement of the yoke sleeve 52 and the yoke 54 with respect to the outer sleeve 56.

The seal 58 may be overmolded onto a portion of the outer sleeve 56 or may be a separate component that may be attached to the outer sleeve 56 in any suitable manner, such as with an adhesive, interference fit, or mechanical attachment. As such, the seal 58 may be fixedly disposed on the outer sleeve 56 and may not rotate with respect to the outer sleeve 56 in one or more embodiments.

It is also contemplated that the outer sleeve 56 and seal 58 may be omitted in one or more configurations. Optionally, a flexible boot may be provided in place of the outer sleeve 56 and seal 58. A flexible boot may extend continuously around the shaft sleeve 50. The flexible boot may have a first end that may be fixedly attached to the exterior or outside circumference of the yoke sleeve 52 and a second end that may extend toward the housing 20. For instance, the second end may be fixedly disposed on or may be integrally formed with a component that does not move axially with respect to the yoke sleeve 52, such as the housing 20, shaft sleeve 50, or deflector 60. A portion of the flexible boot may be configured to move in an axial direction with the yoke sleeve 52. For example, the flexible boot may have alternating folds or an accordion-like structure that may accommodate axial movement. The folds may move toward each other when the yoke sleeve 52 is moved in an axial direction toward the housing 20 and the folds may move away or apart from each other when the yoke sleeve 52 moves in an axial direction away from the housing 20.

Referring to FIGS. 2 and 4, the deflector 60, if provided, may help shield the housing seal 24 from contaminants. The deflector 60 may be spaced apart from the housing 20 and the housing seal 24. The deflector 60 may have a ring-like configuration and may extend continuously around the shaft sleeve 50. In addition, the deflector 60 may be axially positioned such that the deflector 60 may extend around the second shaft sleeve cavity 72. The deflector 60 may be fixedly positioned on the shaft sleeve 50. For instance, the deflector 60 may be positioned on the second flange side surface 92 of the shaft sleeve flange 80.

Figure 5:
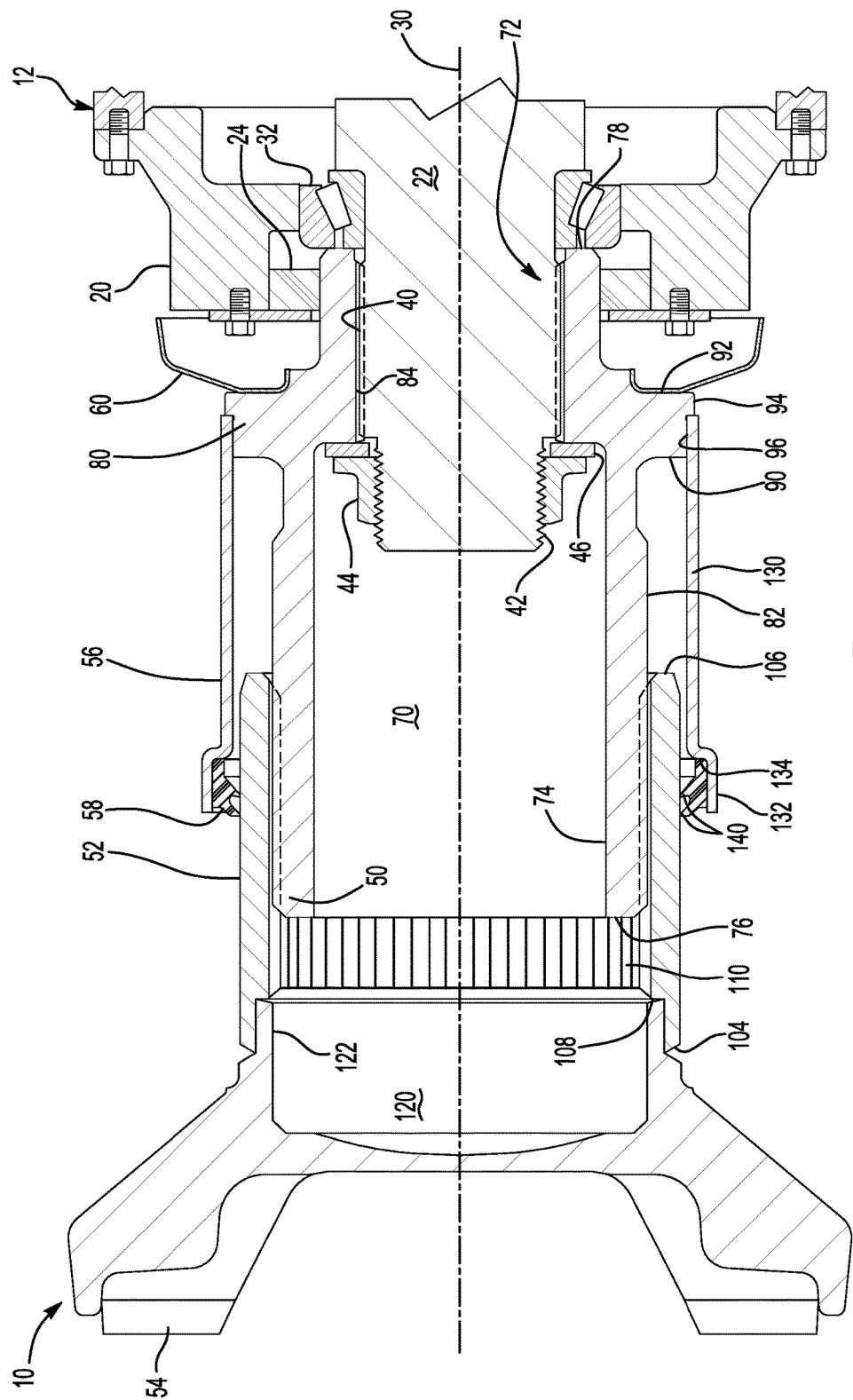
FIG. 5 is a section view of the slip yoke assembly with the yoke and yoke sleeve in a second position.

Referring to FIGS. 4 and 5, axial movement of the slip yoke assembly 10 is depicted. More specifically, the yoke sleeve 52 and the yoke 54 may be movable along the axis 30 with respect to the shaft sleeve 50, the outer sleeve 56, and the seal 58. The yoke sleeve 52 and the yoke 54 may be movable in an axial direction between a first position and a second position.

In FIG. 4, the yoke sleeve 52 and the yoke 54 are shown in a first position. In the first position, the shaft sleeve 50 may limit or stop the yoke sleeve 52 and the yoke 54 from moving in an axial direction toward the housing 20, or to the right from the perspective shown. The shaft sleeve 50 may engage the yoke sleeve 52, the yoke 54, or the yoke sleeve 52 and the yoke 54 in a manner that prevents or stops axial movement of the yoke sleeve 52 and the yoke 54. For example, the second yoke sleeve end surface 106 may engage the first flange side surface 90 to prevent or stop axial movement of the yoke sleeve 52 toward the housing 20. As another example, the yoke 54 may engage the first shaft sleeve end surface 76 to prevent or stop axial movement of the yoke 54 toward the housing 20. In FIG. 4, the second yoke sleeve end surface 106 engages the first flange side surface 90 and the first shaft sleeve end surface 76 engages the yoke 54.

In the first position, the yoke 54 may extend around the shaft sleeve 50 such that the shaft sleeve 50 may be received in the yoke cavity 120. In addition, the outer sleeve 56 may receive a majority of or the entirety of the yoke sleeve 52. In the configuration shown in FIG. 4, the yoke sleeve 52 may be positioned such that the seal 58 may extend around the yoke sleeve groove 108 and a portion of the yoke 54, such as the yoke mounting portion 122.

In FIG. 5, the yoke sleeve 52 and the yoke 54 are shown in a second position. In the second position, the yoke sleeve 52 and the yoke 54 may be moved axially away from the housing 20 or to the left from the perspective shown. The shaft sleeve 50 may not limit or stop axial movement of the yoke sleeve 52 and the yoke 54. For instance, the yoke sleeve 52 may not engage the shaft sleeve flange 80 of the shaft sleeve 50. As such, the second yoke sleeve end surface 106 may be spaced apart from and may not engage the first flange side surface 90. In addition, the yoke 54 may be spaced apart from and may not engage the shaft sleeve 50. As such, the yoke 54 may be spaced apart from and may not engage first shaft sleeve end surface 76. In addition, the shaft sleeve 50 may not be received in the yoke cavity 120 and a majority of the yoke sleeve 52 may not be received in the outer sleeve 56.

The slip yoke assembly 10 may be configured to not limit axial movement of the yoke sleeve 52 and the yoke 54 away from the shaft sleeve flange 80. As such, the yoke sleeve 52 and the yoke 54 may be disengaged from the shaft sleeve 50 by axially moving the yoke sleeve 52 and the yoke 54 further to the left from the perspective shown in FIG. 5. Removal of the yoke sleeve 52 and the yoke 54 from the shaft sleeve 50 may provide access to the nut 44 to facilitate coupling or decoupling of the slip yoke assembly 10 from the shaft 22. The yoke sleeve 52 and yoke 54 may be installed on the shaft sleeve 50 by aligning the yoke sleeve 52 with the shaft sleeve 50 such that the yoke sleeve splines 110 may be received between the first set of shaft sleeve splines 82 and then moving the yoke sleeve 52 axially toward the shaft sleeve flange 80.

The slip yoke assembly as described above may help more evenly distribute the mass of the slip yoke assembly, which may improve balancing and reduce noise and vibration during operation. In addition, the slip yoke assembly may reduce the number of components and mass as compared to existing designs, which may help reduce manufacturing cost and complexity. In addition, the slip yoke assembly as described above may attach directly to a shaft such that the slip yoke assembly may be provided with or coupled to an existing axle assembly configuration. As such, axle assembly components such as the housing and shaft may not require modification or redesign to accommodate the slip yoke assembly. The slip yoke assembly as described above may also combine end yoke functionality (e.g., connection to an input shaft such as a drive shaft or prop shaft) with length adjustment functionality to accommodate changes in length from a torque source (e.g., transmission, transfer case, another axle assembly) to the axle assembly due to suspension articulation (e.g., movement of the suspension system associated with the axle assembly) by combining or joining the yoke and the yoke sleeve as compared to providing such functionality with separate parts. Furthermore, since the shaft of the axle assembly may be received inside the slip yoke assembly a smaller diameter shaft may be provided as compared to a configuration in which a portion of the slip yoke assembly is disposed inside a bore or cavity of the shaft, which may help reduce package space and manufacturing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A slip yoke assembly comprising:
a shaft sleeve that is rotatable about an axis, the shaft sleeve having a first shaft sleeve cavity that extends around the axis, a first shaft sleeve end surface, a second shaft sleeve end surface disposed opposite the first shaft sleeve end surface, and a set of shaft sleeve splines that are arranged around the first shaft sleeve cavity and face away from the axis, wherein the shaft sleeve is fixedly mounted to a shaft that is received inside the shaft sleeve and is rotatably supported by a roller bearing assembly, and the second shaft sleeve end surface engages the roller bearing assembly;
a yoke sleeve that receives the shaft sleeve, the yoke sleeve having a set of yoke sleeve splines that mates with the set of shaft sleeve splines and permits axial movement of the yoke sleeve with respect to the shaft sleeve; and
a yoke that is fixedly disposed on the yoke sleeve, wherein the yoke and the yoke sleeve are moveable along the axis with respect to the shaft sleeve.

2. The slip yoke assembly of claim 1 wherein the yoke sleeve extends continuously around the axis and the shaft sleeve.

3. The slip yoke assembly of claim 1 wherein the yoke sleeve splines are arranged around the shaft sleeve and extend toward the axis.

4. The slip yoke assembly of claim 1 wherein the yoke and yoke sleeve are moveable in an axial direction between a first position in which the shaft sleeve stops axial movement of the yoke and yoke sleeve and a second position in which the shaft sleeve does not stop axial movement of the yoke.

5. The slip yoke assembly of claim 4 wherein the shaft sleeve has a shaft sleeve flange that extends away from the axis, wherein the yoke sleeve engages the shaft sleeve flange when the yoke and yoke sleeve are in the first position and the yoke sleeve does not engage the shaft sleeve flange when the yoke and yoke sleeve are in the second position.

6. The slip yoke assembly of claim 4 wherein the yoke engages the first shaft sleeve end surface when the yoke and yoke sleeve are in the first position.

7. The slip yoke assembly of claim 4 wherein the yoke has a yoke cavity that extends around and receives the shaft sleeve when the yoke is in the first position.

8. The slip yoke assembly of claim 7 wherein the shaft sleeve is not received in the yoke cavity when the yoke is in the second position.

9. The slip yoke assembly of claim 7 wherein the yoke is spaced apart from and does not engage the shaft sleeve when the yoke is in the second position.

10. A slip yoke assembly comprising:
a shaft sleeve having an inner surface that at least partially defines a first shaft sleeve cavity that extends around an axis, a set of shaft sleeve splines disposed opposite the inner surface, and a second shaft sleeve cavity that extends around the axis and that extends from the first shaft sleeve cavity, wherein the second shaft sleeve cavity is configured to receive a shaft such that the shaft sleeve does not rotate with respect to the shaft;
a yoke sleeve that extends around and receives the shaft sleeve, the yoke sleeve having a set of yoke sleeve splines that mates with the set of shaft sleeve splines and permits axial movement of the yoke sleeve with respect to the shaft sleeve;
a yoke that is fixedly positioned with respect to the yoke sleeve; and
an outer sleeve that is disposed on the shaft sleeve and that extends around and receives the yoke sleeve.

11. The slip yoke assembly of claim 10 wherein the outer sleeve is spaced apart from and does not engage the yoke sleeve.

12. The slip yoke assembly of claim 10 further comprising a seal that extends around the axis and that extends from the outer sleeve to the yoke sleeve.

13. The slip yoke assembly of claim 12 wherein the yoke and the yoke sleeve are moveable along the axis with respect to the shaft sleeve, the outer sleeve, and the seal.

14. The slip yoke assembly of claim 13 wherein the yoke is received in the yoke sleeve.

15. The slip yoke assembly of claim 14 wherein the yoke sleeve has a first yoke sleeve end surface that is disposed adjacent to the yoke and a yoke sleeve groove that extends from the first yoke sleeve end surface to the set of yoke sleeve splines, wherein the yoke is received in the yoke sleeve groove.

16. The slip yoke assembly of claim 15 wherein the yoke sleeve has a second yoke sleeve end surface that is disposed opposite the first yoke sleeve end surface, wherein the yoke sleeve splines extend from the yoke sleeve groove to the second yoke sleeve end surface.

17. The slip yoke assembly of claim 15 wherein the yoke and yoke sleeve are moveable between a first position and a second position, wherein the outer sleeve extends around the seal, the seal extends around the yoke sleeve groove and the yoke, and the yoke extends around the shaft sleeve when the yoke and yoke sleeve are in the first position.

18. The slip yoke assembly of claim 12 wherein the outer sleeve has a first cylindrical portion that receives and is fixedly disposed on the shaft sleeve and a second cylindrical portion that is disposed adjacent to the first cylindrical portion, wherein the second cylindrical portion receives the seal and the first cylindrical portion and the second cylindrical portion have different diameters.

19. The slip yoke assembly of claim 18 wherein the second cylindrical portion has a larger diameter than the first cylindrical portion.

20. A slip yoke assembly comprising:
a housing;
a shaft sleeve that is rotatable about an axis with respect to the housing, the shaft sleeve having a first shaft sleeve cavity that extends around the axis and a set of shaft sleeve splines that are arranged around the first shaft sleeve cavity and face away from the axis;

a shaft that is rotatable about the axis and is received in the housing and the shaft sleeve;

a yoke sleeve that receives the shaft sleeve, the yoke sleeve having a set of yoke sleeve splines that mates with the set of shaft sleeve splines and permits axial movement of the yoke sleeve with respect to the shaft sleeve; and a yoke that is fixedly disposed on the yoke sleeve, wherein the yoke and the yoke sleeve are moveable along the axis with respect to the shaft sleeve.

* * * * *